United States Patent
Snow et al.

(10) Patent No.: US 8,812,335 B2
(45) Date of Patent: Aug. 19, 2014

(54) AUTOMATED DIRECT MAIL PROCUREMENT SYSTEM

(71) Applicant: Xerox Corporation, Norwalk, CT (US)

(72) Inventors: Lewis S. Snow, La Crescenta, CA (US); James J. Quackenbush, Vernon, NJ (US); Brian Engle, Clinton, NY (US); Lawrence Flusser, Verdes Estates, CA (US); Arazik Khachatrian, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 39 days.

(21) Appl. No.: 13/672,783

(22) Filed: Nov. 9, 2012

(65) Prior Publication Data

US 2013/0066668 A1    Mar. 14, 2013

Related U.S. Application Data

(62) Division of application No. 12/426,978, filed on Apr. 21, 2009, now Pat. No. 8,341,000.

(51) Int. Cl.
*G06Q 99/00* (2006.01)

(52) U.S. Cl.
USPC ........ 705/7.11; 705/7.12; 705/7.13; 705/7.21

(58) Field of Classification Search
USPC .............................. 705/7.11, 7.12, 7.13, 7.21
See application file for complete search history.

(56) References Cited

U.S. PATENT DOCUMENTS

| | | | |
|---|---|---|---|
| 6,260,024 B1 | 7/2001 | Shkedy | |
| 6,397,197 B1 | 5/2002 | Gindlesperger | |
| 7,346,571 B1 | 3/2008 | Fujita | |
| 2003/0069824 A1 | 4/2003 | Menninger | |
| 2004/0078277 A1* | 4/2004 | Gindlesperger | 705/26 |
| 2004/0107127 A1* | 6/2004 | Kanzinger et al. | 705/9 |
| 2005/0204283 A1* | 9/2005 | Kroeger | 715/530 |
| 2005/0234811 A1 | 10/2005 | Herman et al. | |
| 2007/0233510 A1 | 10/2007 | Howes | |
| 2008/0183596 A1 | 7/2008 | Nash et al. | |
| 2009/0055272 A1 | 2/2009 | Numaoka et al. | |
| 2009/0281878 A1* | 11/2009 | Rane et al. | 705/11 |

OTHER PUBLICATIONS

Microsoft Office Online, "Create Better Meeting Handouts", http://office.microsoft.com/enus/powerpoint/HA012111521033.aspx?mode=print t pp. 1-5, Dec. 3, 2008.

(Continued)

*Primary Examiner* — Akiba Allen

(74) *Attorney, Agent, or Firm* — Gibb & Riley, LLC

(57) ABSTRACT

A machine-implemented method receives job specifications for at least one direct mail printing job from at least one user and creates at least one workflow related to the direct mail printing job. The workflow comprises at least one job activity. The method automatically transmits requests for bids on the job activities to entities for allowing the entities to bid on performing job activities within the workflow. Bids are received on the job activities from the entities and from rate cards previously established by the entities. The method identifies the lowest bids on an individual job activity-by job activity basis from the bids received from the entities and the rate cards and outputs the lowest bids to the user. The method receives an identification of a single selected entity to perform all activities within the workflow from the user and performing the workflow to output the direct-mail printing job.

20 Claims, 10 Drawing Sheets

(56) References Cited

OTHER PUBLICATIONS

Microsoft Office Online, "About Handouts", http://office.microsoft.com/en-us/ powerpoint/HP030765641033.aspx?mode=print, pp. 1-2, Dec. 3, 2008.
U.S. Patent Office Communication, U.S. Appl. No. 12/427,001 Dated Oct. 6, 2011, pp. 1-6.
U.S. Patent Office Communication, U.S. Appl. No. 12/427,001 Dated Dec. 16, 2011, pp. 1-27.
U.S. Patent Office Communication, U.S. Appl. No. 12/427,001 Dated May 22, 2012 pp. 1-26.
U.S. Patent Office Communication, U.S. Appl. No. 12/427,001 Dated Aug. 16, 2012, pp. 1-18.
U.S. Patent Office Communication, U.S. Appl. No. 12/426,978 Dated Oct. 7, 2011, pp. 1-6.
U.S. Patent Office Communication, U.S. Appl. No. 12/426,978 Dated Dec. 14, 2011, pp. 1-24.
U.S. Patent Office Communication, U.S. Appl. No. 12/426,978 Dated May 21, 2012, pp. 1-25.
U.S. Patent Office Communication, U.S. Appl. No. 12/426,978 Dated Aug. 20, 2012, pp. 1-13.
Office Action Communication Notice of Allowance, U.S. Appl. No. 13/670,706 dated Apr. 18, 2013, pp. 1-16.

\* cited by examiner

Job
- Description
- Definition

Direct Mail Job
Lew test Direct Mail Job

Save Job  Cancel

Project/Docket XYZ Monthly Promo Mailing
Definition: Step 1 of 9

All fields marked * are required
Job Id 35706
Name *

Bid Due On *
August ▼  14 ▼  2009 ▼
5 ▼  00 ▼  PM ▼

Category *
Direct Mail
Subcategory *
Print and Personalize

Order/Delivery Due On *
October ▼  27 ▼  2009 ▼
5 ▼  00 ▼  PM ▼

Description *
Example: Rack Brochure for XYZ campaign*

Test Direct Mail job
for XYZ Monthly Promo
Mailing

Artwork Due Date
▼  ▼  ▼
5 ▼  00 ▼  PM ▼

Special Instructions
Example: Please call when proofs are complete

Must begin release to
US Mail on or before
October 15

Customer Name
XYZ Corporation

Customer Department
Marketing

Budget Line/Cost Center
XYZ1234

Samples Requested

Must begin release to
US Mail on or before
October 15

International Buyer Use Only

Ship To

Mail Drop only

Project Name
XYZ Monthly Promo Mailing

Project ID
XYZ-08/10

FIG. 4

Job
• Component Press
• Component Description
  Definition
• Component Press
  XYZ Form
Mail Drop:
  XYZ Mail Drop
List Definition
• XYZ List Direct Mail Job
Lew test Direct Mail Job
Project/Docket XYZ Monthly Promo Mailing
Definition: Step 2 of 9

Save Job | Cancel
Create Template

Forms/Open Item Components
Components
Name          Type
XYZ Form      Offset Form Select Edit Add Delete List Processing Components
Name      Size
XYZ Form  1      Select Edit Add Delete Personalization Components
Name   Quantities
XYZ    1           Select Edit Add Delete Finishing Components
Name   Quantities
XYZ    1           Select Edit Add Delete Mail Prep Components
Name   Quantities
XYZ    1           Select Edit Add Delete

PersonalizeComp1
• Component Finishing
  FinishingComp1

Personalization Services

Job Id
Description                     35663
Preparation
Preparation
Personalization Prep    ☐
Image Digitation(# of    [0]
images)
Text Preparation(# of    [0]
images)
Proof Reel              ☐
Laser

[None ▼]                Size   Side         Forms Input Type  [Select Type ▼]
Ink Jet                 [A5 ▼] [Simplex ▼]  Quantity          [0]
Number of areas to image                    CutoffSheet #Ups  [0]
                        Width  Height       Cutoff Width(mm)  [0]
                        [0]    [0]          Cutoff Height(in) [0]
Category                Paper Type   Toner Type
[None ▼]                [Coated ▼]   [Black ▼]
CScitex                 Width  Height   Number   Add
Number of areas to image [0]   [0]      [0]
                                        Colours  [Black ▼]
Category                Paper Type   Side
                                     Number   Add
                                     [0]
                                     Colours

FIG. 8

Job
• Description
• Component Definition
• Component
  • Personalize:
  • PersonalizeComp1
  • Component Finishing
  • FinishingComp1
• Confirmation
• Preview Rates Direct Mail Job
Lew test Direct Mail Job
Component Finishing: Step 3 of 6

| Finishing Services | | |
|---|---|---|
| Job Id | 3.5663 | |
| Description | | |
| Quantity | 0 | |
| Burst/Trim/Fold | | |
| Bleed | ☐ | |
| Folding | Not Folded ▾ | Glueing |
| Inserting | | Single Use(Spot) 0 ▾ |
| Category | None ▾ | Peelable 0 ▾ |
| Outer Envelope Size | None ▾ | DieCutting |
| Number of insertions | 0 | DieCutting ☐ |
| Stocking/Nesting | | Die Manufacture |
| Category | Interstacking ▾ | Simple None |
| Card Affixing | | Medium None |
| Manual | None ▾ | Complex None |
| Mechanical | None ▾ | Match Mailing |
| Cut Sheet Folding | | Automated 0 |
| Fold Type | None ▾ | Manual 0 |
| Number of Folds | | Pack Proof |
| Cut Sheet Trimming | | Non-Personalized 0 |
| Trimming | T Fold ▾ | Personalized AB 0 |
| | ☐ | Samples 0 |
| | | SEP 0 |
| Edit Details | CUTS: 0 | Labelling(Attaching) |
| | LIFTS: 0 | Self-Adhesive None |
| | | Cheshire None |

Save Job  Cancel
Create Temp.

*FIG. 9*

Job
- Description
- Component Definition
- Component
- Personalize:
- PersonalizeComp1
- Component Finishing
- Component Mail:
- MailPrepComp1
- Confirmation
- Preview Rates Direct Mail Job
Lew test Direct Mail Job
Component Finishing: Step 3 of 6

Finishing Services

Job Id  3-5653
Description  Test

Affidavit of Mailing ☐
Sortation
Carrier Route Sort  None  Quantity  1000
Non-Carrier Route  None  Quantity  0
Drop Ship Preparation
BMC  0
SCF  0
Comingling  0
Postage Affixing
Metering  0
Soltex and Cancel  0
Live Stamp-Manual  0
Live Stamp-Machine  0

[Save Job] [Cancel]
[Create Template]

FIG. 10

Direct Mail Job
Lew test Direct Mail Job
Component Finishing: Step 2 of 4

Open Items

Category [Default ▾]
Quantity Default
Description DIGITAL_PRINT
ENVELOPES
labels
Comm. Print
Bespoke Job
• Description
• Items
• Confirmation
• Vendors Save Job  Cancel
Create Template Back   Continue

FIG. 11

AUTOMATED DIRECT MAIL PROCUREMENT SYSTEM

CROSS-REFERENCE TO RELATED APPLICATIONS

This application is a divisional of U.S. Pat. No. 8,341,000, issued Dec. 25, 2012, the complete disclosure of which, in its entirety, is herein incorporated by reference.

This application is also related to U.S. Pat. No. 8,341,001, issued Dec. 25, 2012, assigned to the present assignee, and is incorporated herein by reference.

BACKGROUND AND SUMMARY

Embodiments herein generally relate to electrostatic printers and copiers or reproduction machines, and more particularly, concerns a campaign management system and method for managing direct mail jobs.

During 2007 marketers in the U.S. spent total of $55.3 billion in direct mail, driving $686.7 billion in sales. By 2012, it is anticipated that American business will spend $61.7 billion on direct mail. In comparison $1.2 billion will be spent on e-mail marketing and $39.7 billion will be spent on Internet (non-e-mail) marketing. In 2012, 27% of marketing budgets will be allocated to direct mail.

The embodiments herein offer reverse auctioning tools for print procurement, which allow print vendors to generate savings for customers by selecting and awarding print jobs to supply vendors who offer lowest pricing and optimum production methods, based upon contractual rates (and capability) submitted by the supply vendors. By including direct mail in the total print volume they procure, print vendors will be able to increase the savings they can offer to their customers. Also, by allowing print procurement potentially without rate cards, print vendors will have the option of working with supply vendors who do not want to submit or negotiate direct mail pricing through rate cards.

More specifically, embodiments herein include a machine-implemented method that receives job specifications for at least one direct mail printing job from at least one user using a computerized or processor-based machine. The machine automatically creates at least one workflow related to the direct mail printing job. Each of the workflows comprise at least one job activity.

The machine automatically transmits these job activities to entities (e.g., supply vendors) to allow the entities to bid on performing the job activities. In response, the machine will receive bids on the job activities from the entities.

The machine automatically identifies the lowest price (cost) bids for each activity (on an individual job activity-by job activity basis) from the bids received from the entities and/or previously established rate cards of the entities. The machine automatically outputs the lowest bids to the user. While this output of the lowest bids indicates which the vendor can perform the workflow at the lowest cost, it also requires each vendor to break their bid down into each of the individual activities of the workflow. This provides the user with information of the actual workflow activity prices bid by each of the vendors and allows the user to understand why one vendor may be bidding at a different price for the direct mail printing job when compared to a different vendor. With such information, the user may be able to engage in additional price negotiation with vendors who have workflow activities that are priced out of line with other vendors. This can allow the user to reduce the overall price paid for a specific direct mail printing job or may allow the user to select a more preferred vendor by having the preferred vendor merely reduce a bid price for a specific activity within the workflow to allow the preferred vendor to ultimately have the lowest overall bid for the entire direct mail printing job.

Therefore, the embodiments herein can also receive workflow modification input from the user in response to the activity bids output to the user. The embodiments herein will then modify the workflow according to the workflow modification input and repeat the transmitting of requests for bids, the receiving of the bids, and the outputting of the lowest bids through at least one iteration.

Once all the negotiation and revisions are complete, the method receives, through the computerized machine, an identification of a single selected entity to perform all activities within the workflow from the user. The embodiments herein perform the workflow by instructing the selected entity to perform the direct mail printing job and thereby provide output to, or for, the user.

The workflow comprises at least one of form workflow, list processing workflow, personalization workflow, open item workflow, etc. The list processing workflow and the personalization workflow have multiple components as part of the job specifications. The list processing workflow has lists of direct mail recipients to process. The personalization workflow has at least one personalization, mail preparation, and finishing components.

More specifically, regarding each of the individual and job activities within each of the workflows, the form workflow comprise prepress activities, press activities, inline operation activities, ink supply activities, paper supply activities, etc. The list processing workflow comprise of list processing setup activities, file preparation activities, file manipulation activities, postal pre-sorting activities, suppression activities, processing and output activities, custom programming activities, electronic output activities, etc. The personalization workflow comprise of personalization preparation activities, image digitalization activities, text preparation activities, personalization proofing activities, ink jet imaging activities, laser imaging activities, scitex imaging activities, burst/trim/folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities, sorting activities, postage affixing activities, electronic production (EPRO) activities, etc. The open item workflow comprises of digital print activities, commercial print activities, envelope activities, label activities, custom activities, etc. With embodiments herein, bids are received for each of the foregoing activities on an individual job activity-by job activity basis from among all of the foregoing activities.

Apparatus embodiments herein include a computer storage media storing instructions and a processor operatively connected to the computer storage media, which performs the instructions. In addition, a graphic user interface, input-output, etc., is/are operatively connected to the processor. The graphic user interface and/or input-output receives job specifications for at least one direct mail printing job from at least one user.

The processor automatically creates at least one workflow related to the direct mail printing job. Again, each of the workflow comprises at least one job activity. The input-output automatically transmits requests for bids on the job activities to entities to allow the entities to bid on performing the job activities, and the input-output receives bids on the job activities from the entities. The graphic user interface can receive user bid selection and/or the processor can automatically select winning bids on an individual job activity-by job activity basis from the bids received from the entities and/or previously established rate cards of the entities.

The processor automatically identifies the lowest price (cost) bids for each activity (on an individual job activity-by job activity basis) from the bids received from the entities and/or previously established rate cards of the entities. The graphic user interface automatically outputs the lowest bids to the user. The graphic user interface can also receive workflow modification input from the user in response to the activity bids output to the user. The processor will then modify the workflow according to the workflow modification input and repeat the transmitting of requests for bids, the receiving of the bids, and the outputting of the lowest bids through at least one iteration.

Once all the negotiation and revisions are complete, the method receives, through the graphic user interface, an identification of a single selected entity to perform all activities within the workflow from the user. The embodiments herein perform the workflow by instructing the selected entity to perform the direct mail printing job and thereby provide output to, or for, the user. Thus, the processor performs the workflow to output, through the input-output, the direct-mail printing job within the campaign.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 4 is a schematic diagram of a screenshot showing potential input fields according to embodiments herein;

FIG. 5 is a schematic diagram of a screenshot showing potential input fields according to embodiments herein;

FIG. 6 is a schematic diagram of a screenshot showing potential input fields according to embodiments herein;

FIG. 7 is a schematic diagram of a screenshot showing potential input fields according to embodiments herein;

FIG. 8 is a schematic diagram of a screenshot showing potential input fields according to embodiments herein;

FIG. 9 is a schematic diagram of a screenshot showing potential input fields according to embodiments herein;

FIG. 10 is a schematic diagram of a screenshot showing potential input fields according to embodiments herein; and FIG. 11 is a schematic diagram of a screenshot showing potential input fields according to embodiments herein.

DETAILED DESCRIPTION

Figure 1:
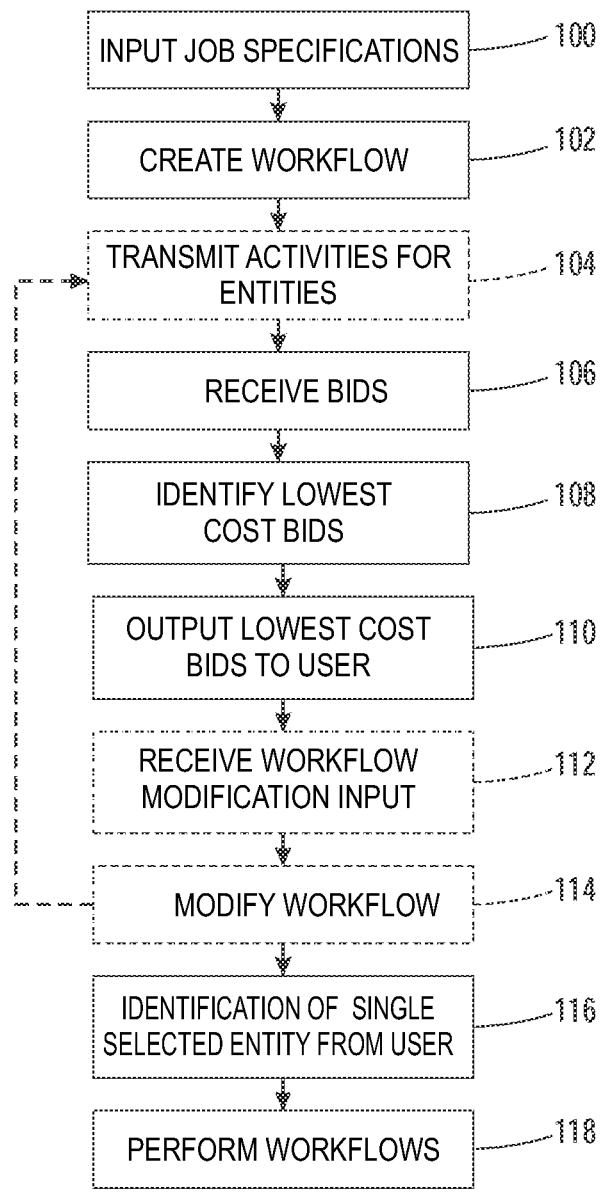
FIG. 1 is a flowchart illustrating embodiments herein.

This functionality of embodiments herein allows print vendors (on-site printing service personnel) to include direct mail in the total print volume of jobs they process. This will increase savings for their customers as well as generate additional revenues for those clients tied to a fee structure based upon procurement volume.

The print procurement process for direct mail is significantly different from commercial print procurement. This difference is due not only to the equipment used in direct mail facilities but also to direct mail specific tasks which have no analog in commercial printing (list processing, mail preparation, etc.).

While direct mail procurement falls within the genus of commercial print it is definitely a unique species. Direct mail offset printing presses have interchangeable press cylinders, introducing a huge variability factor not seen in the commercial print procurement. Press output is also variable in the direct mail arena and is dependent upon subsequent personalization modality. Neither of these two important manufacturing factors is found in commercial printing.

The embodiments herein work with unique services required to process and manipulate raw data to create mailing lists suitable for input into personalization devices and distribution into the mail stream; unique services required to image (personalize) pre-printed masters using a number of unique imaging options; unique services required to transform personalized product from masters into individualized items ready for distribution; and unique services required to prepare individualized items for the mail stream or other distribution.

Once the buyer enters job specifications a list of supply vendors capable of producing the job is created and a preview price is calculated based on the rates collected during the sourcing effort. A sourcing effort is not a simple task. A common effort to source commercial print and direct mail can take as long as nine months, involve dozens of support individuals, and elicit initial participation from nearly 300 potential suppliers. After reviewing submittals the list of potential suppliers is culled. Those remaining engage in entering over 2,000 pricepoints into a database (commonly referred to as an "ASW" or "Advanced Sourcing Workbench"). Those entries are analyzed by sourcing consultants and the list is further culled. Interaction among the consultants and remaining suppliers results in review and adjustment of pricepoints. In the end a select grouping of suppliers is chosen to become providers and to establish rate cards.

If rate cards do not exist for a customer's job, or if requests do not fit within the predetermined specifications, jobs can still be submitted to selected supply vendors for bidding via an open item process of embodiments herein. The open item process can be used for items ranging from CD/DVD duplication, to wide format digital print, to envelopes, to promotional giveaways, etc. In the direct mail module of embodiments herein commercial print jobs can be included in a direct mail campaign through use of the open items functionality. Optimal prices for all open item jobs are achieved through the bidding process.

Once the print vendor has created the job specification and submitted it to the selected supply vendors, the bidding process starts and obtains the best possible price for the specification.

FIG. 1 is a flowchart illustrating the machine-implemented method. In item 100, job specifications for at least one direct mail printing job are input into a computerized machine (having at least one processor and a storage medium) from at least one user (e.g., print vendor).

The embodiments herein automatically create at least one workflow related to the direct mail printing job (item 102). Each of the workflows comprise at least one job activity. The embodiments herein automatically transmit these job activities to entities (e.g., supply vendors) to allow the entities to bid on performing the job activities as shown in item 104. Item 104 is shown as a dashed-box because, if rate cards are maintained, it is possible to omit a live bidding process for each workflow or direct mail printing job.

In response, the machine will receive bids on the job activities from the entities in item 106. If the bids are based on the pre-established rate cards, the solicitation of bids in item 104 can be entirely or partially omitted. If item 104 is omitted, the receiving of the bids (in item 106) comprises receiving the bids from those maintained as rate cards within the computer storage medium of the machine.

The machine automatically identifies the lowest price (cost) bids for each activity (on an individual job activity-by job activity basis) from the bids received from the entities and/or previously established rate cards of the entities in item 108. The machine automatically outputs the lowest bids to the user in item 110.

While this output of the lowest bids indicates which the vendor can perform the workflow at the lowest cost, it also requires each vendor to break their bid down into each of the individual activities of the workflow. This provides the user with information of the actual workflow activity prices bid by each of the vendors and allows the user to understand why one vendor may be bidding at a different price for the direct mail printing job when compared to a different vendor. With such information, the user may be able to engage in additional price negotiation with vendors who have workflow activities that are priced out of line with other vendors. This can allow the user to reduce the overall price paid for a specific direct mail printing job, or may allow the user to select a more preferred vendor by having the preferred vendor merely reduce a bid price for a specific activity within the workflow to allow the preferred vendor to ultimately have the lowest overall bid for the entire direct mail printing job.

The embodiments herein can also receive workflow modification input from the user in item 112 in response to the activity bids output to the user. This is shown by the optional dashed arrow from item 114 back to item 104 in the flow chart in FIG. 1. The embodiments herein could then modify the workflow according to the workflow modification input (item 114) and repeat the transmitting of requests for bids (item 104); the receiving of the bids (item 106); identification of the lowest cost periods (item 108) outputting of lowest cost bids to the user (item 110); and the receipt of additional workflow modifications (item 112) through at least one iteration.

Once all the negotiation and revisions are complete, the method receives, through the computerized machine, an identification of a single selected entity to perform all activities within the workflow from the user in item 116. The embodiments herein perform the workflow by instructing the selected entity to perform the direct mail printing job and thereby provide output to, or for, the user in item 118.

The workflow comprise at least one of form workflow, list processing workflow, personalization workflow, open item workflow, etc., as explained in greater detail below. The list processing workflow and the personalization workflow have multiple components as part of the job specifications. The list processing workflow have lists of direct mail recipients to process. The personalization workflow have at least one personalization, mail preparation, and finishing components.

More specifically, regarding each of the individual and job activities within each of the workflow, the form workflow comprise of prepress activities, press activities, inline operation activities, ink supply activities, paper supply activities, etc. The list processing workflow comprise of list processing setup activities, file preparation activities, file manipulation activities, postal pre-sorting activities, suppression activities, processing and output activities, custom programming activities, electronic output activities, etc. The personalization workflow comprise of personalization preparation activities, image digitalization activities, text preparation activities, personalization proofing activities, ink jet imaging activities, laser imaging activities, scitex imaging activities, burst/trim/ folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities, sorting activities, postage affixing activities, electronic production (EPRO) activities, etc. The open item workflow comprise at least one of digital print activities, commercial print activities, envelope activities, label activities, custom activities, etc.

Figure 2:
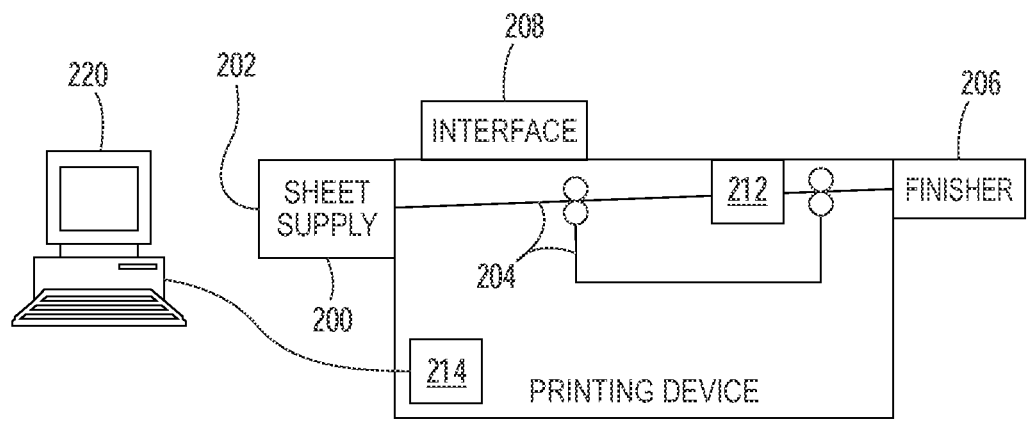
FIG. 2 is a schematic diagram of printer and computer system according to embodiments herein.

The embodiments herein further comprise system and apparatus embodiments. One such embodiment is illustrated in FIG. 2. This apparatus embodiment is illustrated as a printing device 200, and computer or network device 220. More specifically, FIG. 2 illustrates a printing apparatus 200 that includes a printing engine 212 (e.g., an electrostatic and xerographic printing engine) and a media path 204. The media path 204 transports sheets of print media to and from (relative to) the printing engine 212 (e.g., from a sheet supply 202, through the printing engine 212, and finally to a finisher 206). The media path 204 can include belts, rollers, or any other mechanism for moving media sheets.

Item 208 illustrates at least one user interface, item 210 represents the processor (central processing unit (CPU)) or controller, and item 214 represents an input-output device such as a wired or wireless connection to any form of network or other device. The controller 210 is a computerized device and includes at least one computer storage media that stores instructions that the controller 210 executes to control the operations of the various components within the printer 200. The controller 210 can be connected to the sensors, drive rollers, registrations units, etc., and causes the actions described herein to occur.

The word "printer" or "printing device" as used herein encompasses any apparatus, such as a digital copier, bookmaking machine, facsimile machine, multi-function machine, etc. which performs a print outputting function for any purpose. The details of printers, printing engines, etc. are well known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

The computer/network device 220 comprises any commonly available computing device that includes a graphic user interface, user input devices, computer memory (storage media), processor, power supplies, cooling units, etc. Many computerized devices are discussed herein. Computerized devices that include chip-based central processing units (CPU's), input-output devices (including graphic user interfaces (GUI), memories, comparators, processors, etc. are well-known and readily available devices produced by manufacturers such as Dell Computers, Round Rock, Tex., USA and Apple Computer Co., Cupertino, Calif., USA. Such computerized devices commonly include input-output devices, power supplies, processors, electronic storage media memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

Figure 3:
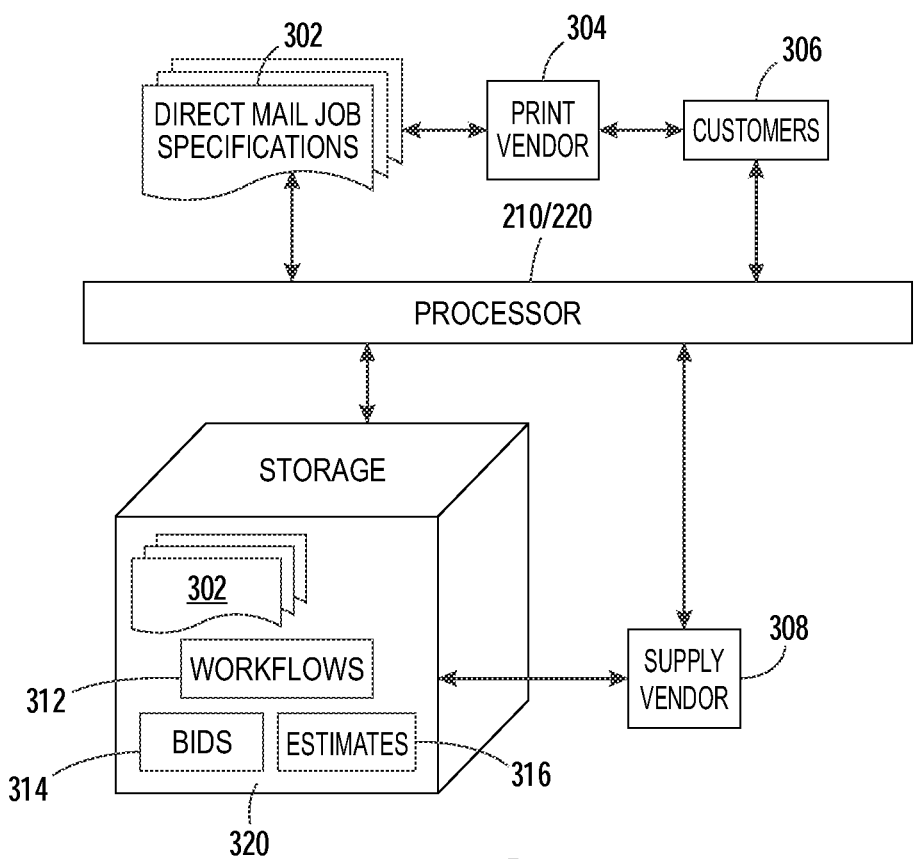
FIG. 3 is a schematic diagram illustrating the flow of various aspects of embodiments herein.

As shown in FIGS. 2 and 3, the graphic user interface 208 and/or input-output 214 receive job specifications 302 for at least one direct mail printing job from at least one user 304 (e.g., print vendor) based on jobs 302 received from customers 306. The processor 210/220 automatically creates at least one workflow 312 related to the direct mail printing job 302. Again, each of the workflow 312 comprises at least one job activity.

The input-output 214 automatically transmits requests for bids on the job activities to entities (supply vendors 308) to allow the entities 308 to bid on performing the job activities, and the input-output 214 receives bids on the job activities from the entities 308. As mentioned above, some supply vendors can store rate cards for various job activities in the computer storage medium 320, which can omit the need to solicit bids from supply vendors for every job activity. Therefore, the bids 314 can be a mixture of rate card bids and vendor supplied the bids. The processor 210/220 can automatically identify lowest cost bids on an individual job activity-by job activity basis from the bids received from the entities and/or previously established rate cards of the entities 308 and/or the graphic user interface 208/220 can receive user bid selection/modification from the user.

The processor 210/220 automatically combines the bids 314 to provide cost and completion estimates 316 for each of the workflows 312. The graphic user interface 208/220 outputs the bids 314 to the user 304 and, in response, can receive workflow modification input from the user 304. The processor 210/220 can modify the workflow 312 according to the workflow modification input (through iterations, if necessary). Finally, after selection by the user, the processor 210/220 performs the workflow 312 to output through, for example, the printing device 200 shown in FIG. 2, or by communicating with the supply vendors who had the winning bids and who can operate any device, such as printing device 200. The final output is printed material that is mailed to potential customers (direct mail).

To model direct mail processing and be able to define specifications of the direct mail job, several types of the direct mail workflow 312 are created. They include: forms jobs, list processing jobs, personalization jobs, and open items.

List processing jobs and personalization jobs could have multiple components as a part of the specification. A list processing job may have several list processing components depending upon the number of lists to process and unique services required to perform that processing. Personalization jobs may have several personalization, mail preparation and finishing components, each one dependent upon the unique services required to perform those functions in a multi-varied direct mail production environment. When the buyer creates a direct mail specification the options are presented to the buyer based on the entered configurations and preferences.

Referring now to FIGS. 4-10, various exemplary screenshots are shown to illustrate one potential way in which the print vendor can communicate with the processor through the graphic user interface. The screenshots illustrated in FIGS. 4-10 are only examples, and those ordinarily skilled in the art would understand that many different other types of ways can be utilized to allow the user to communicate with the embodiments herein.

The buyer (printing vendor) starts the direct mail job through campaign creation using, for example, the screenshot shown in FIG. 4. Therefore, for example, this screenshot allows the user to enter or view information such as the name, category, sub-category, description, customer name, customer department, budget line/cost center, project name, project ID, bid due date, order delivery due date, art work due date, special instructions, samples requested, ship to information, etc. This screenshot also includes information about associated jobs. FIG. 5 similarly shows a screenshot that allows the user to enter or view information such as forms/open item components, list processing components, personalization components, finishing components, mail prep components, etc.

Figure 6:
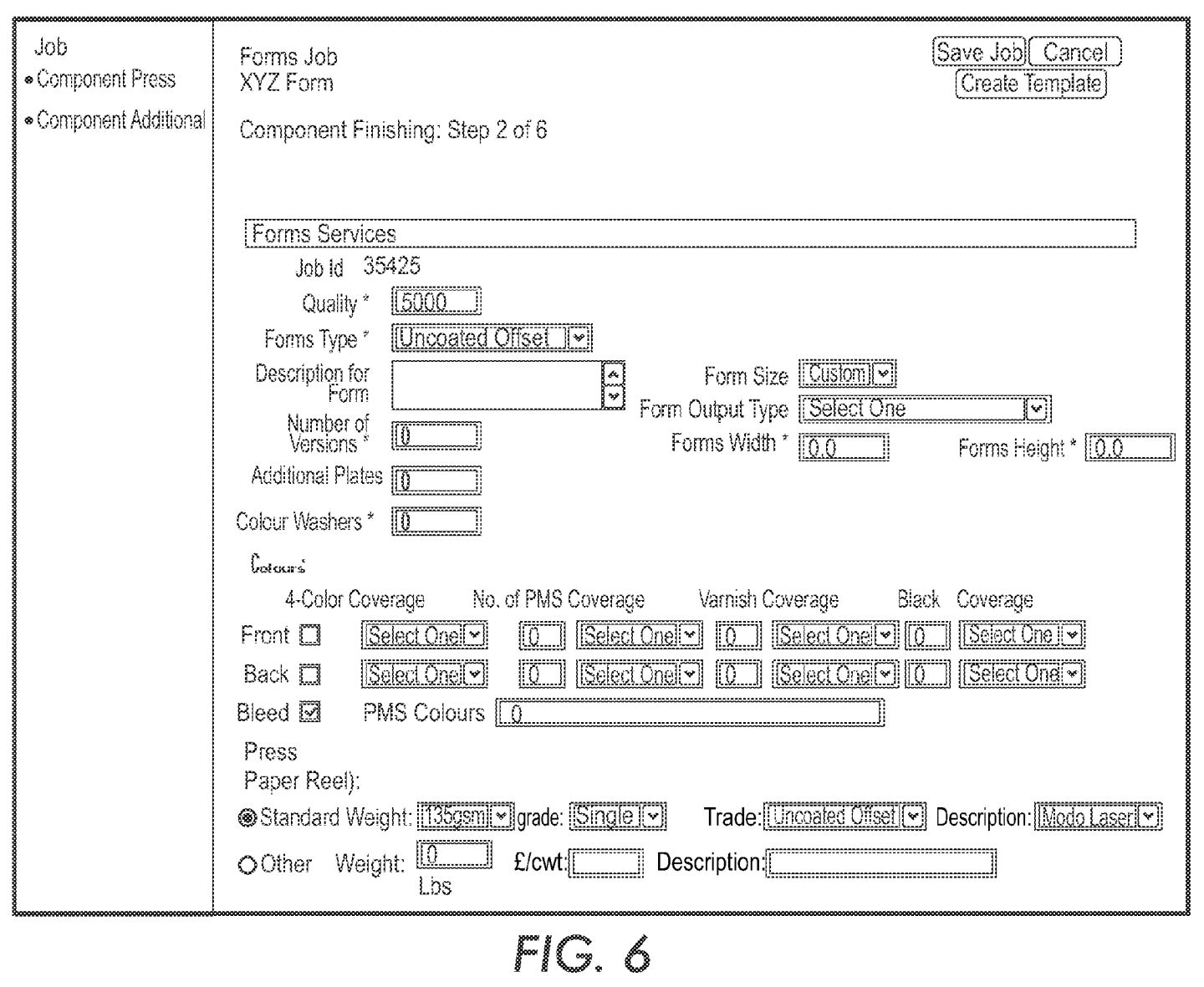

As a part of direct mail printing job creation the buyer could add one or more of the following jobs to the direct mail printing job:
1. Forms Component:
  a. Using forms component workflow the buyer can create one or more forms components that specify the creation of masters or other pieces for direct mail that will be processed and personalized in the manufacturing process. For example, FIG. 6 shows a potential screenshot that allows the user to input the quantity, the form type, the description for the form, the number of versions, the additional plates, the color washes, information about the different colors, the form size, the form output type, the form width, the form height, as well as press information.
  b. To source and price forms components, multiple forms services are created. Each service may have single or multiple pricing points.
    i. Forms services include:
      1. Forms Prepress
      2. Forms Press
      3. Forms Press Inline Operations
      4. Forms Inks
      5. Forms Paper
  c. Embodiments herein use a print type determination specific for direct mail printing to calculate the optimal print type for the component specification. First the optimal cylinder size is calculated based on the form's size, then a preview price is calculated for all supported presses, with the best press price selected.

Figure 7:
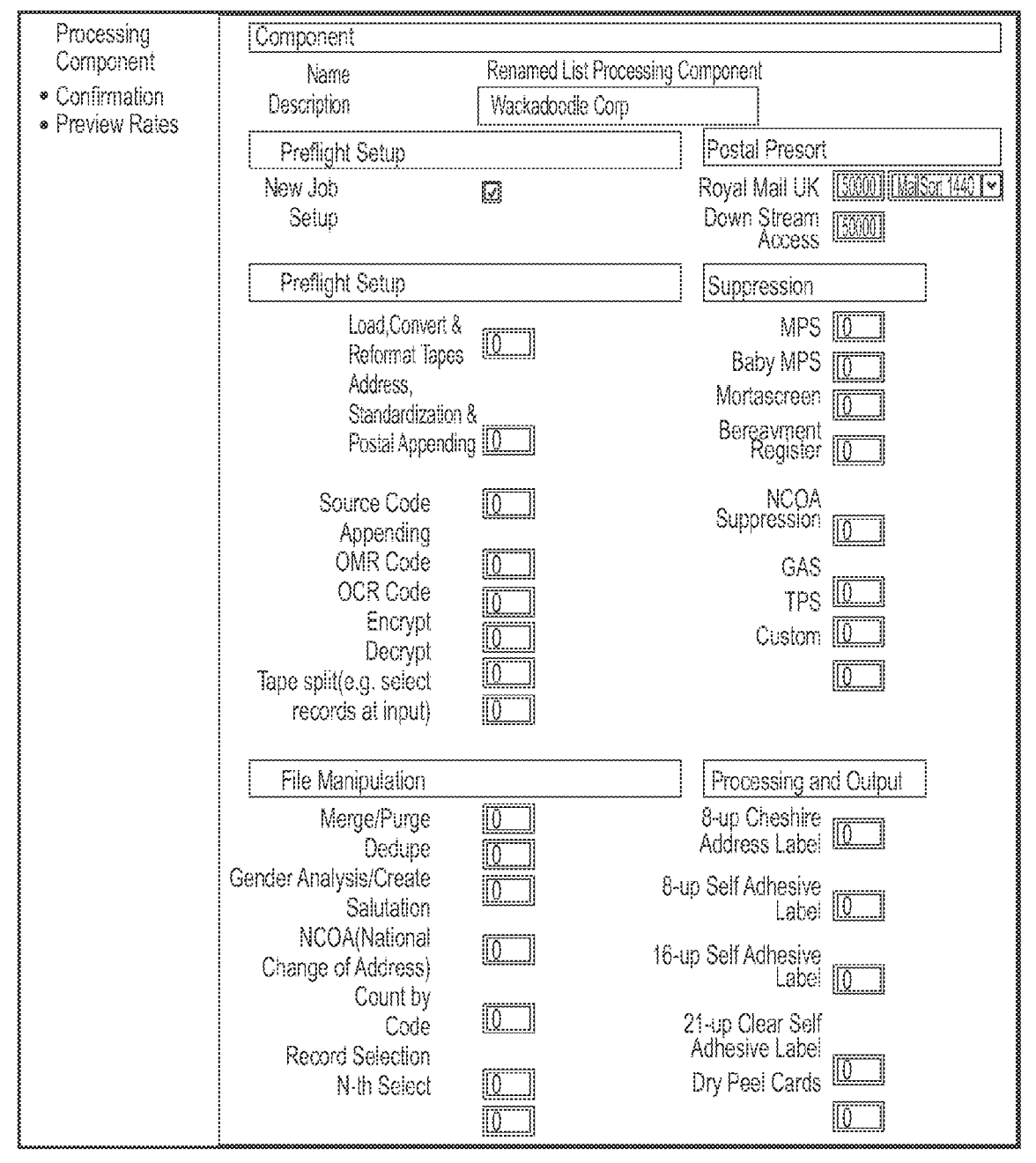

Press cylinder size calculation methods:
  1. Determine largest available cylinder size for total colors needed (for United Kingdom and other countries using the metric system convert inches to millimeters)
  2. Divide by flat length to get number of ups on a cutoff
  3. Run pricing calculations
  4. Repeat for next largest available cylinder size
  5. Continue until all options are calculated
  6. Select press type, number of ups and cylinder size based upon lowest priced calculation 2. List Processing Components:
  a. Using list processing workflow the buyer can create one or multiple list processing components to specify receipt of raw data files and, using multiple service options, and modify it into the proper format for personalization output. For example, the screenshot shown in FIG. 7 provides/receives information regarding the component name and description, the preflight setup, the postal pre-sorting, the file preparation, suppression, file manipulation, processing and output, etc.
  b. To source and price list processing components multiple list processing services are created within one or more components. Each service may have single or multiple pricing points as defined during sourcing.
    i. List processing services include:
      1. List Processing Setup
      2. File Preparation
      3. File Manipulation
      4. Postal Presort
      5. Suppression
      6. Processing and Output 7. Custom Programming
   8. Electronic Output
3. Personalization Components:
a. Using a personalization workflow, the buyer can create one or multiple personalization components to specify forms personalization. The personalization component workflow can use multiple components to specify the placement of unique data on a master manufactured within a forms job, or supplied in a pre-manufactured state. For example, the screenshot shown in FIG. 8 allows input of (or provides) information regarding personalization services including job identification, description, personalization preparation, form input type, image digitalization, quantity, test preparation, cutoff sheet, proofing, laser, inkjet, scitex, paper category, etc.
b. To source and price personalization jobs multiple personalization services are created within a personalization component and their price points are defined during sourcing.
   i. Personalization services include:
      1. Personalization Preparation
      2. Image Digitization
      3. Text Preparation
      4. Personalization Proofing
      5. Ink Jet imaging
      6. Laser imaging
      7. Scitex imaging
4. Finishing Components:
a. Using a finishing workflow, the buyer can create one or multiple finishing components to specify forms finishing. The finishing component workflow can use multiple components to specify the manipulation of personalized product into individual pieces for the distribution process. For example, the screenshot shown in FIG. 9 can provide and/or receive information regarding job identification, description, quantity, burst/trim/fold, and gluing, folding, inserting, die cutting, card affixing, match mailing, cut sheet folding, packed proofing, cut sheet trimming, labeling, etc.
b. To source and price personalization jobs multiple finishing services are created within a component and their price points are defined during sourcing.
   i. Finishing services include:
      1. Burst/Trim/Fold
      2. Inserting
      3. Stacking
      4. Card Affixing
      5. Cut Sheet Folding
      6. Cut Sheet Trimming
      7. Gluing
      8. Die Cutting
      9. Die Manufacture
      10. Match Mailing
      11. Pack Proofs
      12. Labeling
      13. Mailing Security
      14. Spoils Recovery
5. Mail Preparation Components:
a. Using a mail preparation workflow, the buyer can create one or multiple finishing components to specify mail preparation requirements. The mail preparation component workflow can use multiple components to specify the sorting, bagging and other processing of finished product for final distribution. For example, the screenshot shown in FIG. 10 illustrates the input/display of job description, sorting information, postage affixing, etc.
b. To source and price personalization jobs multiple mail preparation services are created within a mail prep component and their price points are defined during sourcing.
   i. mail preparation services include:
      1. Sorting
      2. Postage Affixing
      3. EPRO
6. Open Item Components
a. Open item components can be created within a direct mail printing job for pricing of product oriented materials without collection of the rates in the sourcing process. For example as shown in the screenshot in FIG. 11, the open item component information includes category, quantity, description, etc. This allows creation of specifications not currently supported in direct mail:
   i. Open item components include digital print, commercial print, envelopes, labels, bespoke ("Custom" or "Other").

The separate direct mail organization is created to access supply vendors with direct mail capability (this could be done on the buying organization level rather than per-job level). Vendors can configure different presses (UV [Ultraviolet], Coldset, Heatset) based upon shop floor availability. When job are specified, optimization occurs upon the most economical forms press. If rates are available, the list of capable supply vendors for each direct mail job is generated and the bidding process starts. The campaign functionality also manages information from each direct mail job about the best preview price and best vendor.

After the bidding process is completed the buyer can award each individual activity job contained within the campaign to one selected supply vendor. The one-stop-shop modality allows jobs to be allocated to a single capable supply vendor. Overall, the embodiments herein allow print vendors to include direct mail in the total print volume they procure for their clients and thereby achieve greater savings.

Thus, the present embodiments collect contracted rates for processes and materials and store that in a database. Conventional systems do not gather rates (contracted or otherwise). The present embodiments qualify vendors as capable both using profiles and contracted rates. The embodiments herein collect many (e.g., more than 5,000) rate datapoints, providing a highly granular qualification and qualify vendors for exact, highly-detailed job manufacturing specifications and product categories.

The rate data concept of embodiments herein generates contract pricing for each vendor without necessitating the need for vendor interaction. This is a highly unique aspect of the embodiments herein. These systems and methods generate contract pricing (a "preview price") as the starting point of the bidding process. The buyer is able to review pricing and modify specifications independently prior to placing the job out to bid. The buyer is also able to uniquely rule-out higher-priced suppliers before submitting to bid. In effect, the invention serves as an arm of the supplier's estimating and sales department, eliminating a significant amount of interaction normally required in the estimating and bidding process.

The embodiments herein are two-way. In addition to the buyer generating a job and placing out to bid, a supplier (if requested) can create a job within the application (if requested to do so via phone, or to demonstrate another manufacturing option) and submit that "quote" to the buyer.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A machine-implemented method comprising:
receiving job specifications for at least one direct mail printing job from at least one user into a computerized machine;
automatically, using said computerized machine, creating at least one workflow related to said direct mail printing job, said workflow comprising a plurality of individual job activities;
after creating said workflow, automatically, using said computerized machine, transmitting requests for bids on said job activities to entities for allowing said entities to bid on performing job activities within said workflow, said requests for bids requiring each of said entities to break their bid down into each individual job activity of said workflow;
receiving bids on said job activities from said entities and from rate cards previously established by said entities;
receiving user bid selection and identifying lowest bids on an individual job activity-by job activity basis from said bids received from said entities and said rate cards;
automatically, using said computerized machine, outputting said lowest bids on said individual job activity-by job activity basis to said user by identifying which bidder can perform all said workflow at a lowest cost and breaking each bid down into said individual job activity-by job activity basis;
receiving workflow modification input from said user in response to said outputting;
modifying said workflow according to said workflow modification input and repeating said transmitting of requests for bids, said receiving of said bids, and said outputting of said lowest bids through at least one iteration;
receiving, through said computerized machine, an identification of a single selected entity to perform all said individual job activities within said workflow from said user; and
performing said workflow to output said direct mail printing job through said selected entity.

2. The method according to claim 1, said workflow comprising at least one of form workflow, list processing workflow, personalization workflow, finishing workflow, mail preparation workflow and open item workflow.

3. The method according to claim 2, said form workflow comprising at least one of prepress activities, press activities, inline operation activities, ink supply activities, and paper supply activities.

4. The method according to claim 2, said list processing workflow comprising at least one of list processing setup activities, file preparation activities, file manipulation activities, postal pre-sorting activities, suppression activities, processing and output activities, custom programming activities, and electronic output activities.

5. The method according to claim 2, said personalization workflow comprising at least one of personalization preparation activities, image digitalization activities, text preparation activities, personalization proofing activities, ink jet imaging activities, laser imaging activities, scitex imaging activities.

6. The method according to claim 2, said finishing workflow comprising at least one of burst/trim/folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities.

7. The method according to claim 2, said mail preparation workflow comprising at least one of sorting activities, postage affixing activities, and electronic production activities.

8. A machine-implemented method comprising:
receiving job specifications for at least one direct mail printing job from at least one user into a computerized machine;
automatically, using said computerized machine, creating at least one workflow related to said direct mail printing job, said workflow comprising a plurality of individual job activities;
after creating said workflow, automatically, using said computerized machine, transmitting requests for bids on said job activities to entities for allowing said entities to bid on performing job activities within said workflow, said requests for bids requiring each of said entities to break their bid down into each individual job activity of said workflow;
receiving bids on said job activities from said entities and from rate cards previously established by said entities;
automatically, using said computerized machine, outputting lowest bids on an individual job activity-by job activity basis to said user by identifying which bidder can perform all said workflow at a lowest cost and breaking each bid down into said individual job activity-by job activity basis;
receiving user bid selection and identifying lowest bids on an individual job activity-by job activity basis from said bids received from said entities and said rate cards;
receiving, through said computerized machine, an identification of a single selected entity to perform all said individual job activities within said workflow from said user; and
performing said workflow to output said direct mail printing job through said selected entity.

9. The method according to claim 8, said workflow comprising at least one of form workflow, list processing workflow, personalization workflow, finishing workflow, mail preparation workflow and open item workflow.

10. The method according to claim 9, said form workflow comprising at least one of prepress activities, press activities, inline operation activities, ink supply activities, and paper supply activities.

11. The method according to claim 9, said list processing workflow comprising at least one of list processing setup activities, file preparation activities, file manipulation activities, postal pre-sorting activities, suppression activities, processing and output activities, custom programming activities, and electronic output activities.

12. The method according to claim 9, said personalization workflow comprising at least one of personalization preparation activities, image digitalization activities, text preparation activities, personalization proofing activities, ink jet imaging activities, laser imaging activities, scitex imaging activities.

13. The method according to claim 9, said finishing workflow comprising at least one of burst/trim/folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities.

14. The method according to claim 9, said mail preparation workflow comprising at least one of sorting activities, postage affixing activities, and electronic production activities.

15. An apparatus comprising:
a computer storage media storing instructions;
a processor operatively connected to said computer storage media, said processor performing said instructions;
a graphic user interface operatively connected to said processor, said graphic user interface receiving job specifications for at least one direct mail printing job from at least one user, said processor automatically creating at least one workflow related to said direct mail printing job, said workflow comprising a plurality of individual job activities; and
an input-output operatively connected to said processor, said input-output automatically, after said workflow is created, transmitting requests for bids on said job activities to entities for allowing said entities to bid on performing job activities within said workflow, said requests for bids requiring each of said entities to break their bid down into each individual job activity of said workflow, said input-output receiving bids on said job activities from said entities and from rate cards previously established by said entities,
said graphic user interface receiving user bid selection and identifying lowest bids on an individual job activity-by job activity basis from said bids received from said entities and said rate cards,
said processor automatically outputting said lowest bids on said individual job activity-by job activity basis to said user by identifying which bidder can perform all said workflow at a lowest cost and breaking each bid down into said individual job activity-by job activity basis,
said graphic user interface receiving workflow modification input from said user in response to said outputting, said processor modifying said workflow according to said workflow modification input and repeating said transmitting of requests for bids, said receiving of said bids, and said outputting of said lowest bids through at least one iteration,
said graphic user interface receiving an identification of a single selected entity to perform all activities within said workflow from said user, and
said processor performing said workflow to output said direct mail printing job through said selected entity.

16. The apparatus according to claim 15, said workflow comprising at least one of form workflow, list processing workflow, personalization workflow, mail preparation workflow, finishing workflow, and open item workflow.

17. The apparatus according to claim 16, said form workflow comprising at least one of prepress activities, press activities, inline operation activities, ink supply activities, and paper supply activities.

18. The apparatus according to claim 16, said list processing workflow comprising at least one of list processing setup activities, file preparation activities, file manipulation activities, postal pre-sorting activities, suppression activities, processing and output activities, custom programming activities, and electronic output activities.

19. The apparatus according to claim 16, said personalization workflow comprising at least one of personalization preparation activities, image digitalization activities, text preparation activities, personalization proofing activities, ink jet imaging activities, laser imaging activities, scitex imaging activities.

20. The apparatus according to claim 16, said finishing workflow comprising at least one of burst/trim/folding activities, inserting activities, stacking activities, card affixing activities, cut sheet folding activities, cut sheet trimming activities, gluing activities, die cutting activities, die manufacture activities, match mailing activities, packed proofing activities, labeling activities, mailing security activities, spoils recovery activities.

* * * * *